(12) United States Patent
Carraro et al.

(10) Patent No.: US 6,320,589 B1
(45) Date of Patent: Nov. 20, 2001

(54) DISPLAY TECHNIQUES FOR THREE DIMENSIONAL VIRTUAL REALITY

(75) Inventors: Gianpaolo U. Carraro; James Robert Ensor, both of Red Bank, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 08/906,214

(22) Filed: Aug. 4, 1997

(51) Int. Cl.7 ................................................. G06T 15/00
(52) U.S. Cl. .............................................. 345/473; 345/474
(58) Field of Search ........................................ 345/473, 474, 345/420, 425, 302; 382/154

(56) References Cited

U.S. PATENT DOCUMENTS

| | | | |
|---|---|---|---|
| 5,261,041 | * | 11/1993 | Susman ................................. 345/419 |
| 5,369,736 | * | 11/1994 | Kato et al. ........................... 345/420 |
| 5,937,079 | * | 8/1999 | Franke ................................. 382/154 |

\* cited by examiner

Primary Examiner—Cliff N. Vo
(74) Attorney, Agent, or Firm—Eugene J. Rosenthal

(57) ABSTRACT

A limitation of a three-dimensional world in which objects in the distance may be represented in only two dimensions as a video on a screen is that when an object within the field represented by the video undergoes a trajectory that takes it to a location in the world that is not represented by the video but instead is a location in the foreground which is represented by computer graphics, namely, any portion of the object that is no longer on the video screen disappears. To overcome this limitation, when an object within the field represented by the video undergoes a trajectory that takes it to a location in the world that is not represented by the video but instead is a location in the foreground which is represented by computer graphics, such an object, or portion thereof, is made to continue to be visible to the user by representing it at the foreground location to which its trajectory was carrying it using computer graphic techniques, rather than video. Thus, the video object "pops" out of the video and becomes visible, e.g., in front of, or to the side of, the video screen, rather than becoming invisible because it is no longer on the video screen.

21 Claims, 3 Drawing Sheets

(2 of 3 Drawing Sheet(s) Filed in Color)

DISPLAY TECHNIQUES FOR THREE DIMENSIONAL VIRTUAL REALITY

TECHNICAL FIELD

This invention relates to the integration of computer graphics and video to provide a realistic three dimensional virtual reality experience.

BACKGROUND OF THE INVENTION

The display of a three dimensional world to a viewer requires considerable computation power, and it is typically costly to develop the necessary highly detailed models required for doing so. In order to simplify the problem, a portion of the world that is in the distance may be represented in only two dimensions as a video displayed on a surface, e.g., a screen. By video it is meant the common usage of the term, such as the placing or projecting of predefined images on the surface, e.g., the electronic version of filmed moving pictures. Thus, such a world is essentially truncated in length to the screen on which the video is displayed. A great reduction in computation power and cost can be achieved by such an arrangement.

SUMMARY OF THE INVENTION

We have recognized that a limitation of such a world occurs when an object within the field represented by the video undergoes a trajectory that takes it to a location in the world that is not represented by the video but instead is a location in the foreground which is represented by computer graphics, namely, any portion of the object that is no longer on the video screen, disappears. Therefore, in accordance with the principles of the invention, when an object within the field represented by the video undergoes a trajectory that takes it, or a portion thereof, to a location in the world that is not represented by the video but instead is a location in the foreground which is represented by computer graphics, such an object or portion is made to continue to be visible to the user and is represented at the foreground location using computer graphic techniques, rather than video. Thus, the video object "pops" out of the video and becomes visible, e.g., in front of, or to the side of, the video screen, rather than becoming invisible because it is no longer on the video screen.

BRIEF DESCRIPTION OF THE DRAWING

The file of this patent contains at least one drawing executed in color. Copies of this patent with color drawings will be provided by the Patent and Trademark Office upon request and payment of the necessary fee.

In the drawing.

DETAILED DESCRIPTION

Figure 1:
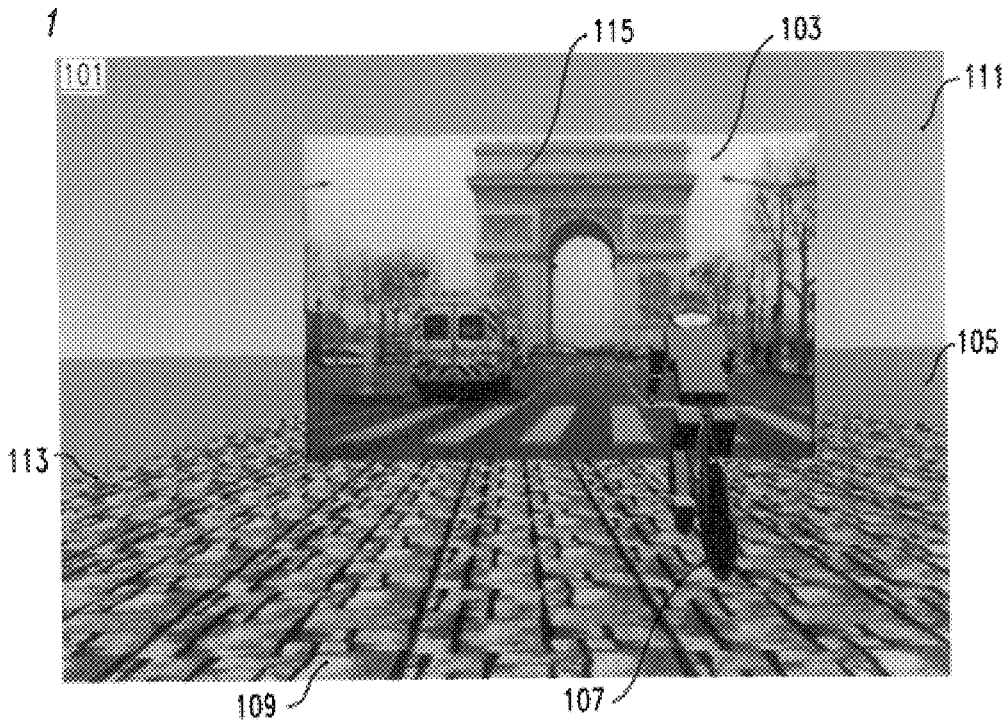
FIGS. 1–3 show an example of a video object "popping" out of a video and so becoming visible in front of, or to the side of, the video screen, in accordance with the principles of the invention.
Figure 2:
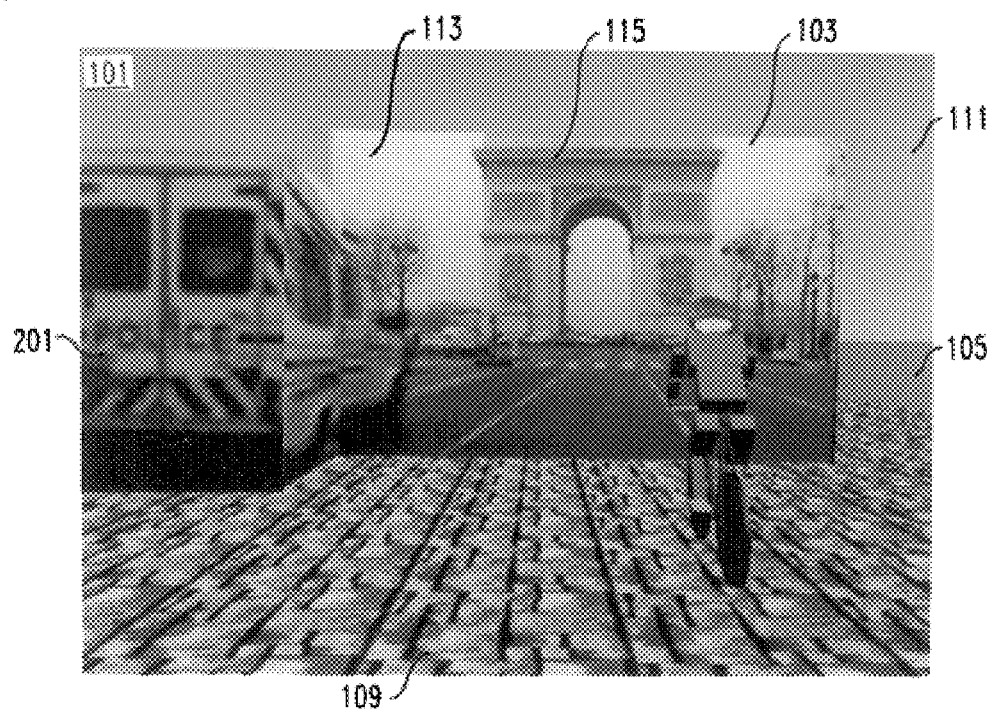
Figure 3:
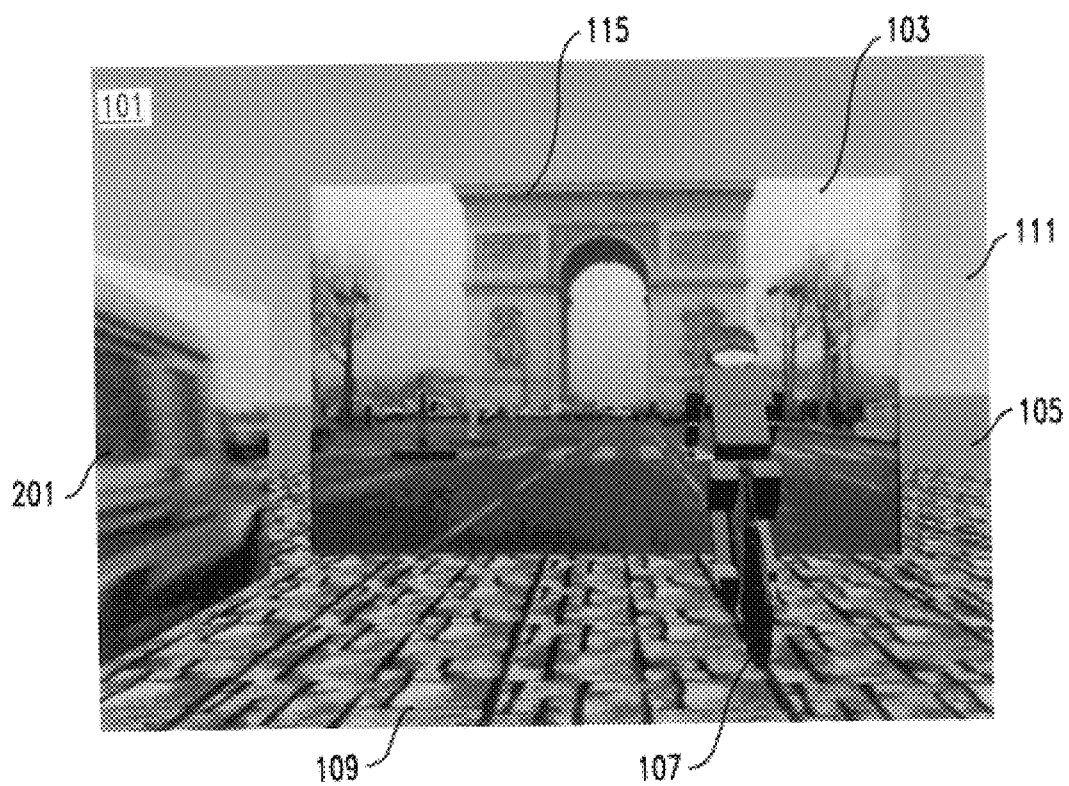

To better illustrate the invention, FIGS. 1–3 show an example of that which a user sees according to the invention when an object, that is displayed as video on a video screen of a world that has a portion of the world distant from the point of view of the user represented in only two dimensions as a video on the video screen, undergoes a trajectory that takes at least a portion of it to a location in the world that is not represented by the video but instead is a location in the world that is represented by computer graphics, and such an object or portion is made to yet be visible to the user by representing the object at its location off of the video screen using computer graphic techniques, rather than video. In other words, FIGS. 1–3 show an example of a video object "popping" out of the video and becoming visible in front of, to the side of, above, or below the video screen, rather than simply becoming invisible because it is no longer on the video screen. For simplification of terminology purposes, a portion of an object may simply be referred to as an object, since any portion of an object may be considered an object in its own right.

FIG. 1 shows world 101, which is the Champs Elysees in Paris, France, as one approaches La Place de l'Etoile in the center of which is the Arc de Triomphe, built by Napoleon Bonaparte. World 101 is divided into two portions, video screen 103, on which is shown the current frame of a video and the remainder of the world 105, which is represented using computer graphics techniques, and is thus referred to herein as computer graphics part (CG Part) 105. The current frame of video being displayed on video screen 103 includes police van 113 and Arc de Triumph 115. Within CG Part 105 there are various elements, such as bicyclist 107, representing the user, road 109, and sky 111.

Note that the viewpoint of the user is actually behind the representation of the user in the form of bicyclist 107. Also note that police van 113, which is part of the current video frame being shown on video screen 103, is moving slower than bicyclist 107, so that police van 113 will eventually be passed by bicyclist 107 as he continues to ride toward Arc de Triumph 115.

FIG. 2 shows world 101 of FIG. 1, but at a later time. At the time of FIG. 2, the frame of video being shown on screen 103 is from a view closer to Arc de Triumph 115. Such a frame may have resulted, for example, from moving the camera that captured the video closer to Arc de Triumph 115. As a result of the camera location when the frame of video on screen 103 that is shown in FIG. 2 was taken, only a portion of police van 113 was captured video frame. The rest of the police van 113 was out of view of the camera, and hence is not visible within the current frame of video on screen 103 that is shown in FIG. 2. However, from the viewpoint of the user, looking at world 101 as it appears in FIG. 2, the remaining portion of police van 113 should be visible, notwithstanding that it is no longer within the boundaries of video screen 103. Therefore, in accordance with the principles of the invention, the remaining portion of police van 113 is displayed using computer graphic techniques within world 101 as element 201, which is a part of CG Part 105.

FIG. 3 shows world 101 of FIG. 1, but at a time even later than that of FIG. 2. Thus, at the time of FIG. 3, the frame of video being shown on screen 103 is from a view still closer to Arc de Triumph 115 than that of FIG. 2. As a result of the camera location when the frame of video on screen 103 that is shown in FIG. 3 was taken, none of police van 113 is visible within the current frame of video on screen 103 that is shown in FIG. 3. However, from the viewpoint of the user, looking at world 101 as it appears in FIG. 3, police van 113 should be visible to the user's left, notwithstanding that it is no longer within the boundaries of video screen 103.

Therefore, in accordance with the principles of the invention, the entirety of police van 113 is displayed using computer graphic techniques within world 101 as element 201, which is a part of CG Part 105. At least a portion of element 201 will continue to be displayed as part of CG Part 105 until element 201 passes completely from the user's viewpoint.

Figure 4:
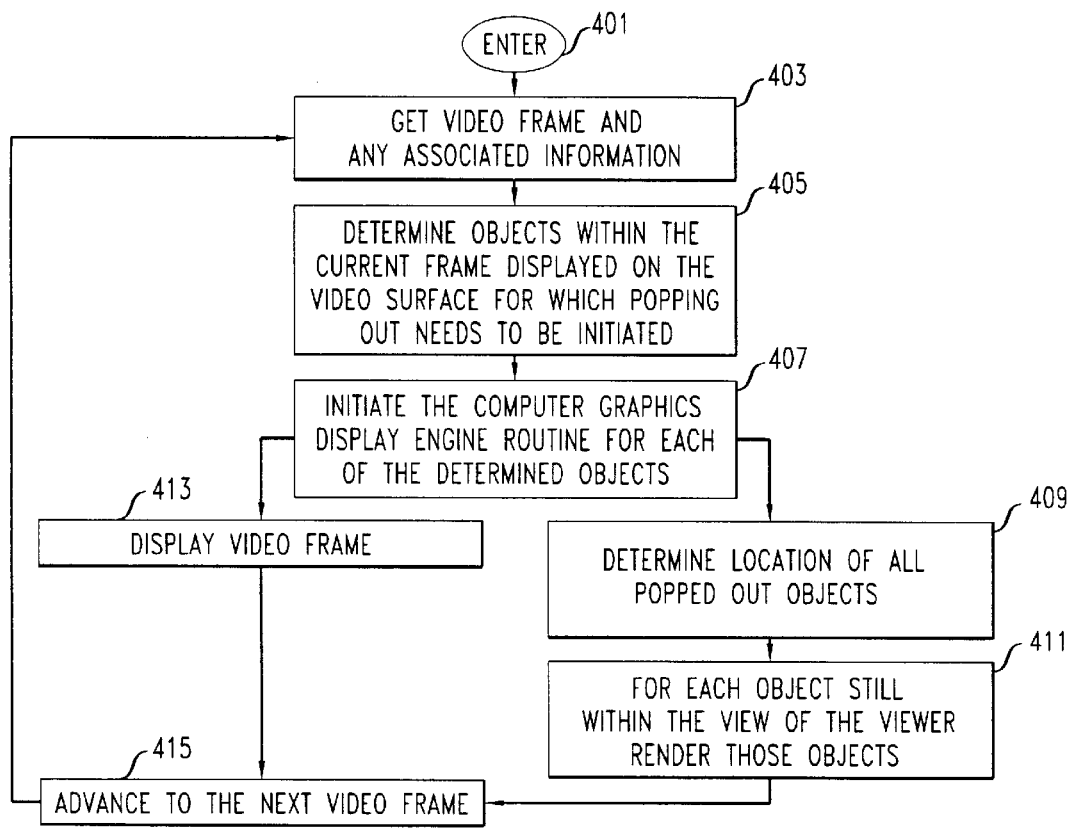
FIG. 4 shows an exemplary process by which objects within the field represented by the video surface that, due to their projected motion are to be in the three dimensional world, are so displayed using computer graphics techniques, e.g., the object "pops out" of the video surface, in accordance with the principles of the invention.

FIG. 4 shows an exemplary process by which an objects within the field represented by the video surface that, due to its projected motion is to be displayed in the three dimensional world, e.g., in front of, to the side of, above, or below, the video surface, is so displayed using computer graphics techniques, so that the object "pops out" of the video surface. In typical embodiments of the invention, the objects to be displayed using computer graphics are predefined, and their location in the video and the time associated with its position within the video is known, so that the time and extent at which the object needs to be popped out of the video is known. However, the techniques of the invention may be employed with computers and software which are sufficiently sophisticated to track recognizable objects within the video surface and to develop computer graphics models from such video representations in order to create the popped out computer graphics.

The process is entered in step 401 when the user selects a video to view and the first frame of the video is to be displayed to a user. In step 403, the video frame to be displayed is retrieved. This may be achieved by retrieving data representing the frame which is pointed to by a pointer. Such a frame pointer is set initially, e.g., in step 401, to point to the first frame of the video. Next, in step 405, it is determined if there are any objects with the current video frame which is to be displayed on the video screen for which popping out needs to be initiated. This may be achieved by employing additional information associated with the frame that describes any objects that need to be popped out. Such additional information may also include data necessary to render the object as well as motion data which indicates the path of the object. Alternatively, this step may be achieved by analyzing the content of the video frame, perhaps in conjunction with prior frames and future frames, to determine data necessary to render the object as well as motion data which indicates the path of the object. In addition, the viewpoint given to the user by the overall display may be incorporated in the determination. Such a viewpoint is determined by camera controls, which may be set by the user. Of course, a combination of the foregoing techniques may also be employed. In step 407, a computer graphics display engine routine is initiated for each of the objects determined in step 405. Each of these computer graphics routines are supplied with the information necessary to generate their respective objects as time passes with each frame for display on the video surface. For example, the information supplied for each object may include the aforementioned motion data which indicates the path of the object.

Next, steps 409 and 411 are performed substantially in parallel with step 413. The degree of parallelism to be achieved should enable the popped out objects to be displayed substantially while the frame is displayed so that the user perceives them as being displayed together at the same time.

In step 409, a location on the viewscreen is determined for each of objects for which a computer graphics display engine routine is executing. In step 411, each of the objects for which a computer graphics display engine routine is executing that are still within the view of the viewer are rendered. Optionally, the computer graphics display engine routine for any object that has moved so that it is no longer within the view of the viewer may be deleted. However, such computer graphics display engine routines should only be deleted provided that it is known that the motion path of the object or the viewpoint of the viewer will not again bring that object into view.

The video frame is displayed in step 413. Control then passes from both steps 411 and 413 to step 415. In step 415 the next video frame is advanced to, provided that there is one. This may be achieved by incrementing or otherwise updating the value of the frame pointer. Thereafter, control passes back to step 403 and the process continues as described above.

In another implementation of the basic process of FIG. 4, the video screen is moving within the overall three-dimensional world being displayed to the user. Instead of determining which objects require the initiating of popping out based on information about objects in the frame being displayed on the video surface, as described above, the initiation may be based on the current location of the video screen within the overall three-dimensional world being displayed to the user. For example, if the video screen is displaying a video which gives the user the feeling of traveling down the Champs Elysees each successive video frame is actually a representation of the view from a location further and further down the street. As the frames are displayed and the user's viewpoint moves further down the street, it may be necessary for objects, e.g., a bus, a pedestrian, or a parked car, to pop off the video screen and become represented by computer graphics. The computer graphics display engine routine for each of the objects may be initiated as a function of the distance traveled by the video screen down the street, which, for example, may be either indicated in additional information associated with the frame, or, for simple situations, determined as a predetermined function of the time that the video has been running.

In another embodiment of the invention, a three-dimensional world ready for rendering, including all the elements that must pop out of the video surface, is modeled in memory. The three-dimensional world includes information such as the spatial location, size and orientation for each of the elements that must pop out. Motion information for the pop out elements may also be included. In this embodiment, the video screen is moving within the overall three-dimensional world that is being displayed to the user, as described above. Each frame of the video has spatial information which describes the location of the video screen within the three-dimensional world stored in memory. Such information may be implied, e.g., if the video screen is moving at a constant rate of speed, or it may be in separate information that is associated with the video frame. Using the information about each video pop out element as well as the information about the location of the video screen allows the spatial location of each video pop out element, as well as the portion of each video pop out element that is not blocked by the video screen and is within the viewpoint of the user, to be determined for each frame. Therefore, when the video screen is at a particular location, the portion of any video pop out element that is visible, e.g., in front of or to the side of, above, or below, the video screen may be rendered on the display. Thus, a match may be achieved between what is seen on the video screen and the computer graphic pop out elements.

Figure 5:
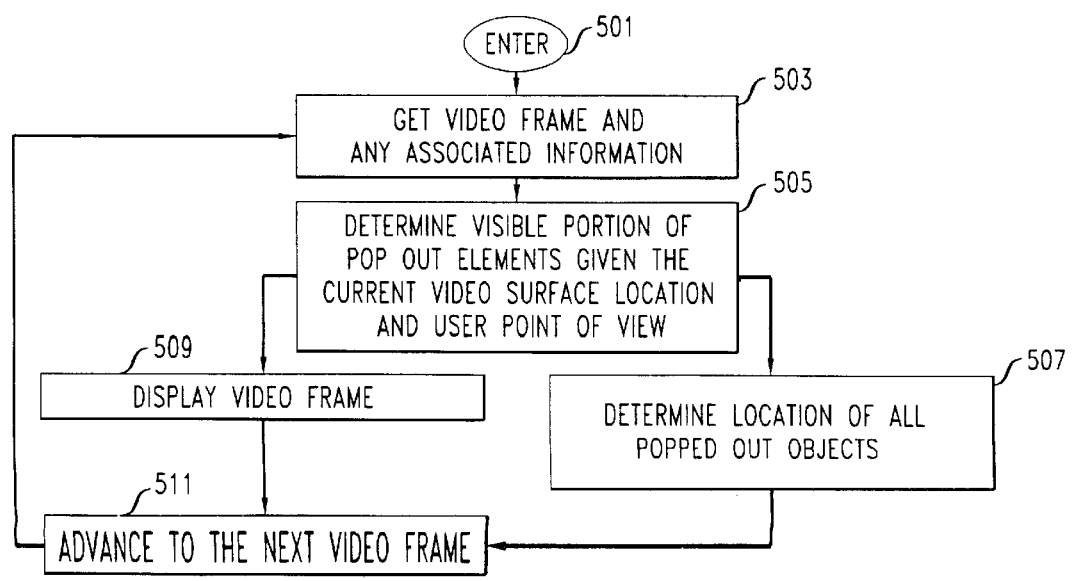
FIG. 5 shows a flow chart of a process of another embodiment of the invention.

A process for implementing this embodiment is shown, in flow chart form, in FIG. 5. Note that prior to entering the process shown in FIG. 5 a three-dimensional world including all the elements that must pop out of the video surface must be pregenerated and stored in memory. Also, spatial information which describes the location of the video screen within the three-dimensional world must be associated with frames of the video and stored in memory.

The process is entered in step 501 when the user selects a video to view and the first frame of the video is to be displayed to a user. In step 503, the video frame to be displayed is retrieved. This may be achieved by retrieving data representing the frame which is pointed to by a pointer. Such a frame pointer is set initially, e.g., in step 501, to point to the first frame of the video. In step 505, the location of the video screen within the three-dimensional world is determined. As noted, such information may be implied, e.g., if the video screen is moving at a constant rate of speed, or it may be in separate information that is associated with the video frame. Next, in step 507, the visible portion of any pop out elements is determined as a function of the current video surface location and the user viewpoint.

Thereafter, steps 507 and 509 are performed substantially in parallel. The degree of parallelism to be achieved should enable the popped out objects to be displayed substantially while the frame is displayed, so that the user perceives them as being displayed together at the same time. In step 507, the determined visible portion of each of the pop out elements is rendered. The video frame is displayed in step 509. Control then passes from both steps 507 and 509 to step 511. In step 511 the next video frame is advanced to, provided that there is one. This may be achieved by incrementing or otherwise updating the value of the frame pointer. Thereafter, control passes back to step 503 and the process continues as described above.

The foregoing assumes that the video frame to be displayed is set, which determines the location of the video screen within the three-dimensional world. However, the converse may also be implemented, i.e., the location of the video screen within the three-dimensional world is set, and this determines which video frame is to be displayed. To do so, in step 501 or 511, in which the video frame to be displayed next is determined, the desired location of the video screen within the three-dimensional world is ascertained. This location may be specified as a function of user input. For example, if the scene being displayed corresponds to the view of a user on a bicycle, the location of the video screen may be determined by sensors mounted to a stationary bicycle which detects riding of the bicycle by the user. A search of the information identifying the location of the frames is conducted to determine which frame corresponds to the current location of the screen, and the frame pointer is set to point to that frame.

The various method of determining which frame is displayed may be used separately, or their usage may be intermixed, depending on the need of the application being implemented.

Note that frames for which it is known that no pop out elements will be displayed need not be associated with spatial information which describes the location of the video screen within the three-dimensional world stored in memory. The video is simply displayed on the video screen and no pop out elements are rendered.

Any prestored information, such as frames, and information associated therewith, as well as models of the three-dimensional world, may be stored in different segments. Such segments may be located at a single physical location, e.g., within a single computer, or at different physical locations, such as in various computers that are connected by a network, and made available for use with embodiments of the invention. Moreover, the elements which process the information to generate the display may, but need not be, contained within a single computer.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in processing a view of a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object which is represented as part of said video on said video screen has moved, from the point of view of a viewer of said world, to a location that is off of said video screen, so that said object can no longer be displayed on said video screen and will disappear from said world; and changing the representation of said object from a video representation to one modeled as computer graphics whereby said object remains visible in said world, albeit not on said video screen, and said video screen continues to exist in said world.

2. The method as defined in claim 1 wherein said object has moved to a location in said three dimensional world that is at a location which is one or more of in front of, to the side of, above, or below, a screen on which said video is being rendered.

3. The method as defined in claim 1 wherein said determining step includes the step of analyzing said video for changes in identifiable objects therein.

4. The method as defined in claim 1 wherein said determining step includes the step of obtaining additional information about said object which is necessary to render said object as computer graphics.

5. The method as defined in claim 1 wherein said determining step includes the step of obtaining additional information about said object which is necessary to render said object as computer graphics and wherein said additional information is associated with a frame of said video.

6. The method as defined in claim 1 wherein said determining step includes the step of obtaining additional information identifying said object.

7. The method as defined in claim 1 wherein said determining step includes the step of obtaining additional information and wherein said additional information includes information about said object in at least one category from the set of categories including spatial location, size, orientation, and motion information.

8. The method as defined in claim 1 wherein said video is displayed on a video screen that is moving within said first portion of said world which is modeled as computer graphics.

9. A method for use in processing a view of a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object which is represented as part of said video on said video screen has moved, from the point of view of a viewer of said world to a location that is off of said video screen, so that said object can no longer be displayed on said video screen and will disappear from said world; and revealing a representation of said object as computer graphics whereby said object remains visible in said world, albeit not on said video screen and said video screen continues to exist in said world.

10. The method as defined in claim 9 further including the step of prestoring said representation of said object as computer graphics.

11. The method as defined in claim 9 wherein said representation of said object as computer graphics is prestored, said representation including information for at least one category from the set of categories including spatial location, size, orientation, and motion information.

12. The method as defined in claim 9 wherein said video screen is moveable in said world and wherein said step of revealing is initiated as a function of a position of said video screen in said world.

13. The method as defined in claim 9 wherein said video screen is moveable in said world and wherein said step of revealing, is initiated by said video screen moving past said representation of said object as computer graphics.

14. The method as defined in claim 9 wherein said step of revealing is performed by a computer graphics display engine, and wherein said step of revealing is initiated as a function of a position of said video screen in said world.

15. Apparatus for use in processing a view of a three dimensional world in which a first portion of said world is modeled as computer graphics and a second portion of said world is represented by a video, wherein said video is made up of a sequence of images displayed on a video screen which exists in said first portion of said world, said video displaying a plurality of objects, said apparatus comprising:

means for determining that an object which is represented as part of said video on said video screen has moved, from the point of view of a viewer of said world, to a location that is off of said video screen, so that said object can no longer be displayed on said video screen and will disappear from said world; and means for changing the representation of said object from a video representation to one modeled as computer graphics whereby said object remains visible in said world, albeit not on said video screen, and said video screen continues to exist in said world.

16. The apparatus as defined in claim 15 wherein said object has moved to a location in said three dimensional world that is at a location which is one or more of in front of, to the side of, above, or below, a screen on which said video is being rendered.

17. Apparatus for use in processing a view on a three dimensional world in which a first portion of said world is modeled as computer graphics and a second portion of said world is represented by a video, comprising:

means for determining that an object being represented by said video has moved to a location that is being modeled as computer graphics; and means for revealing a representation of said object as computer graphics.

18. The apparatus as defined in claim 17 further wherein said object has moved to a location in said three dimensional world that is at a location which is one or more of in front of, to the side of, above, or below, a screen on which said video is being rendered.

19. A system for displaying an apparently three dimensional world to a user, in which a first part of said three dimensional world is displayed as computer graphics and a second part is displayed as video on a video screen, wherein said video is made up of a sequence of images displayed on a video screen which exists in said first portion of said world, said video displaying a plurality of objects, the method, said system comprising:

a processor for determining that an element displayed as video on said video screen transited, from the point of view of a viewer of said world, from said second part to said first part so that said object can no longer be displayed on said video screen and will disappear from said world; and a rendering engine for displaying said world with said element displayed in said first part rather than said second part whereby said object remains visible in said world, albeit not on said video screen, and said video screen continues to exist in said world.

20. The system as defined in claim 19 wherein rendering engine includes said processor.

21. The system as defined in claim 20 wherein said video screen is within said first part.

* * * * *